US012798890B2

(12) United States Patent
Hennek

(10) Patent No.: US 12,798,890 B2
(45) Date of Patent: Nov. 17, 2026

(54) JOINT RAILING ADJUSTMENT OF SEVERAL TRANSPORT DEVICES

(71) Applicant: KRONES AG, Neutraubling (DE)

(72) Inventor: Heinz Hennek, Neutraubling (DE)

(73) Assignee: KRONES AG, Neutraubling (DE)

( * ) Notice: Subject to any disclaimer, the term of this patent is extended or adjusted under 35 U.S.C. 154(b) by 322 days.

(21) Appl. No.: 18/523,247

(22) Filed: Nov. 29, 2023

(65) Prior Publication Data

US 2024/0190663 A1 Jun. 13, 2024

(30) Foreign Application Priority Data

Dec. 9, 2022 (DE) ......................... 102022132756.6

(51) Int. Cl.
*B65G 43/00* (2006.01)
*B65G 21/20* (2006.01)

(52) U.S. Cl.
CPC ......... *B65G 43/00* (2013.01); *B65G 21/2072* (2013.01); *B65G 2203/04* (2013.01)

(58) Field of Classification Search
CPC . B65G 43/00; B65G 21/2072; B65G 2203/04
USPC ........................................................ 198/836.3
See application file for complete search history.

(56) References Cited

U.S. PATENT DOCUMENTS

| | | | | |
|---|---|---|---|---|
| 4,986,056 A * | 1/1991 | Evans | B65B 59/003 53/247 |
| 5,605,217 A * | 2/1997 | Risley | B65G 21/2036 198/689.1 |
| 5,706,933 A * | 1/1998 | Ouellette | B65G 21/2072 198/836.3 |
| 7,721,876 B2 * | 5/2010 | Hartness | B65G 21/2072 198/836.3 |
| 10,204,247 B1 * | 2/2019 | Hamer | B65G 43/08 |
| 2010/0082149 A1 | 4/2010 | Till et al. | |
| 2010/0258411 A1 * | 10/2010 | Thomas | B65G 43/00 198/866 |

(Continued)

FOREIGN PATENT DOCUMENTS

| | | |
|---|---|---|
| CN | 101641280 A | 2/2010 |
| CN | 104729413 A | 6/2015 |

(Continued)

OTHER PUBLICATIONS

Office Action from correspondence Chinese Patent Application No. 202311680127.8 dated Nov. 15, 2025.

*Primary Examiner* — Mark A Deuble
(74) *Attorney, Agent, or Firm* — Caesar Rivise, PC

(57) ABSTRACT

The invention relates, inter alia, to an installation comprising several transport devices for transporting objects through the installation, wherein the several transport devices are arranged distributed in the installation and each have at least one adjustable railing for setting the transport width. A sensor system is designed to monitor several monitoring regions that each extend along one of the several adjustable railings for person detection. A processing device is configured to operate the several transport devices for jointly adjusting the adjustable railings depending on the monitoring of the several monitoring regions via the sensor system. Advantageously, the installation can enable a safe and automated central adjustment of all rails of the installation.

18 Claims, 1 Drawing Sheet

(56) References Cited

U.S. PATENT DOCUMENTS

| | | | | |
|---|---|---|---|---|
| 2013/0261790 | A1 * | 10/2013 | Conroy .................. | B65G 43/02 700/230 |
| 2022/0204277 | A1 * | 6/2022 | Zilzer .................... | B65G 43/00 |

FOREIGN PATENT DOCUMENTS

| | | | | | |
|---|---|---|---|---|---|
| CN | 112051605 | A | | 12/2020 | |
| GB | 2237107 | A | * | 4/1991 | ............ E21F 13/004 |
| WO | WO2008052212 | A2 | | 5/2008 | |
| WO | WO-2024156860 | A1 | * | 8/2024 | ............. B65G 43/10 |

* cited by examiner

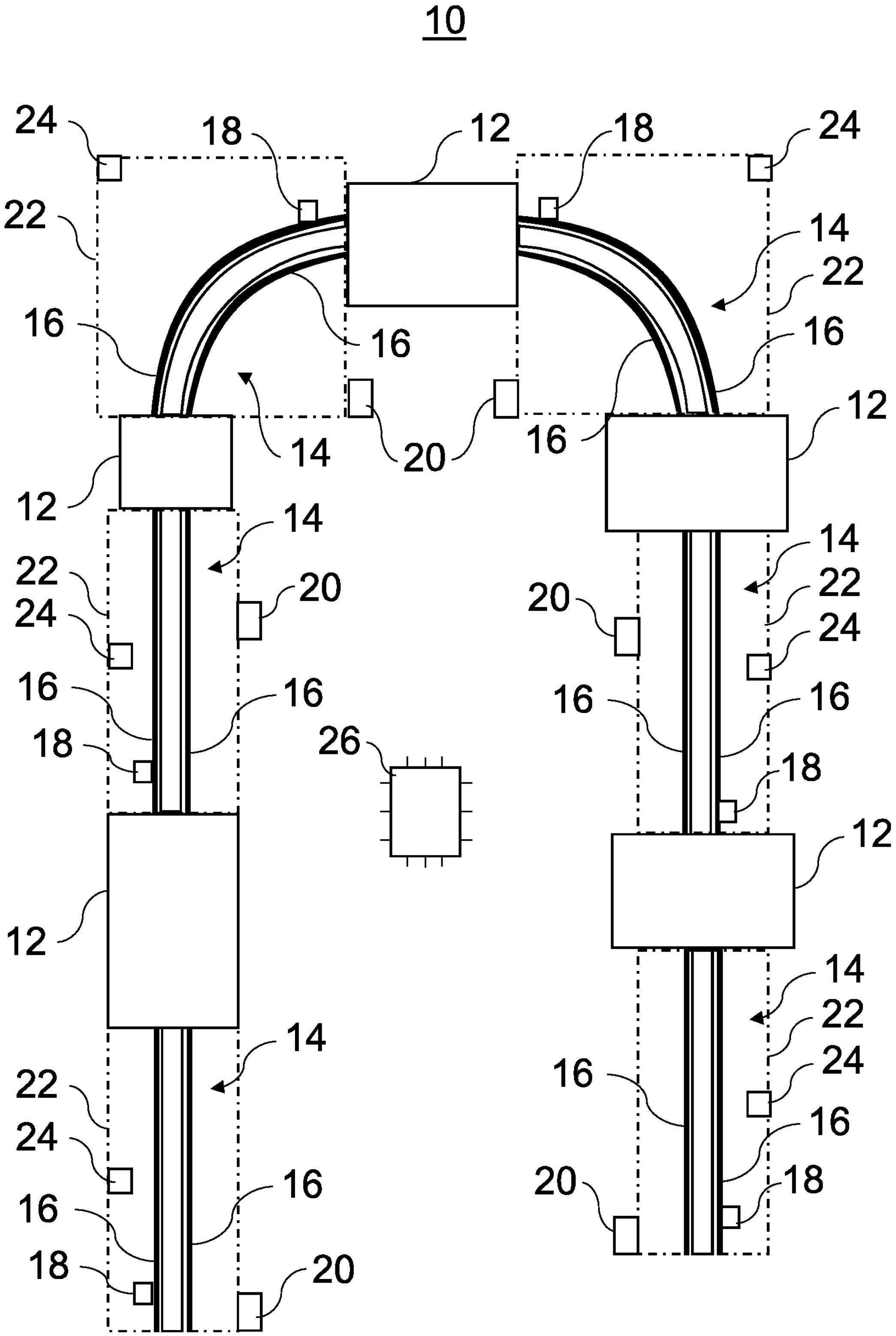
10
24
18
12
18
24
22
14
22
16
16
16
16
14
20
12
12
14
14
22
20
20
22
24
24
16
16
16
16
18
26
18
12
12
14
14
22
22
24
16
24
16
20
16
18
18
20

JOINT RAILING ADJUSTMENT OF SEVERAL TRANSPORT DEVICES

CROSS-REFERENCE TO RELATED APPLICATIONS

This application claims priority from German Patent Application No. DE 10 2022 132 756.3, filed Dec. 9, 2022, the contents of which application is incorporated herein by reference in its entireties for all purposes.

TECHNICAL FIELD

The invention relates to an installation, preferably an industrial installation, more preferably a container processing installation. The invention further relates to a method for operating an installation, preferably an industrial installation, particularly preferably a container processing installation.

TECHNICAL BACKGROUND

Today and in the future, container processing installations and other installations should be operable as flexibly as possible. One aspect of this is that, if possible, objects such as containers with different sizes and/or formats can be processed in the same installation. In this context, for example, transport devices in such installations can have adjustable railings with which a transport width of the transport devices can be adjusted to adapt to differently dimensioned and/or shaped objects.

WO 2008/052212 A2 discloses an assembly for positioning side rails for a conveyor for handling objects which extends in a conveying direction. The assembly comprises a frame, two side rails which are movably attached to the frame on opposite sides of the conveyor and extend along the conveying direction, wherein each side rail comprises an input gear. A gear train extends between an actuator and the at least one input gear, whereby the movement of the actuator in the one or the other direction simultaneously moves the side rails toward or away from one another via the gear train and the input gear. Multiple rail assemblies can be used along a conveyor, across different sides of a conveyor, and along or across different conveyors. The several assemblies can be controlled by a common control device.

The invention is based on the object of creating an improved technique for adjusting the railings. The technique should preferably enable a safe and joint adjustment as far as possible of all adjustable railings of an installation.

SUMMARY

The object is achieved by the features of the independent claims. Advantageous developments are specified in the dependent claims and the description.

One aspect of the present disclosure relates to an installation, preferably an industrial installation, particularly preferably a container processing installation. The installation has several transport devices for transporting objects, preferably containers, through the installation. The several transport devices are arranged in a distributed manner in the installation, and each have at least one adjustable railing for setting the transport width. The installation has a sensor system which is designed to monitor several monitoring regions which each extend along one of the several adjustable railings (and are therefore associated with the particular rail, for example), for person detection (e.g., by image recognition, movement detection, temperature detection, and/or acoustic detection). The installation has a processing device which is configured to operate (e.g., control) the several transport devices for jointly adjusting the adjustable railings depending on the monitoring of the several monitoring regions via the sensor system.

Advantageously, the installation can enable a safe and common central adjustment of the several railings. The adjustment regions of the railings can preferably be monitored by the monitoring regions. The railing adjustment can accordingly be completely automated and, for example, does not have to be triggered in a decentralized manner for each transport device. If a person is detected in the monitoring region, the joint adjustment can, for example, not be triggered or can be stopped in order to reduce the risk of injury (e.g., crushing) to the person from the adjustment. The automated sequence can advantageously also exclude human operating errors. It is also unnecessary to provide enclosures or similar protective measures for the transport devices in order to enable a safe, joint adjustment of the railings. This ultimately makes it possible to save time and costs.

In one exemplary embodiment, the processing device is further configured to operate the adjustable railings for joint adjustment only when no person has been detected in the several monitoring regions by the sensor system. Advantageously, a risk of injury to workers in the installation can accordingly be significantly reduced.

In another exemplary embodiment, the processing device is further configured to operate only those adjustable railings for joint adjustment, in whose (associated) monitoring regions no person was detected by the sensor system. Alternatively or additionally, the processing device is further configured to operate only those adjustable railings for joint adjustment in whose (associated) monitoring regions no person is detected via the sensor system until ultimately all adjustable railings have been adjusted. Advantageously, at least those railings in the vicinity of which no persons are located can accordingly be adjusted together. Specifically in the case of very large installations, it can happen that always at least one worker is moving in the installation and accordingly could block the joint adjustment of all railings if all monitoring regions always have to be simultaneously free of persons. Advantageously, a total period of time until all railings are actually adjusted can accordingly be reduced, without thereby increasing the risk of injury.

In one embodiment, the installation further has at least one output device for outputting warning signals (e.g., acoustic and/or visual) signals to the several monitoring regions. Preferably, the processing device can furthermore be configured to operate the at least one output device for outputting a (e.g., first) warning signal before and/or during the joint adjustment of the adjustable railings. Alternatively or additionally, the processing device can furthermore be configured to operate the at least one output device for outputting a (e.g., second) warning signal when a person is detected in one of the several monitoring regions. In this way, persons can advantageously be warned to not approach when the railings are being adjusted or to move away when the rails are to be adjusted.

The first warning signal and the second warning signal can preferably differ from one another, for example with respect to volume, content, and/or position.

In another embodiment, the processing device is further configured to stop the joint adjustment of the adjustable railings when a person is detected in one of the several monitoring regions via the sensor system during the joint adjustment. Advantageously, this can accordingly prevent a person who has not yet been in the monitoring region during the initialization of the joint adjustment of the railings from later injuring himself on the adjusting railings by carelessly entering the monitoring region.

In a further embodiment, the processing device is further configured to stop an adjustment during the joint adjustment of the adjustable railings, preferably temporarily, only for that adjustable railing in whose (assigned) monitoring area a person is detected by the sensor system during the adjustment, and preferably to continue the adjustment when it has been detected via the sensor system that the person has left his (assigned) monitoring region. As already explained in another example, a total time period until all rails are actually adjusted can therefore advantageously be reduced without thereby increasing the risk of injury.

In one embodiment variant, the processing device is further configured to operate the several transport devices for transporting objects, preferably containers, independently of the monitoring of the several monitoring regions via the sensor system. Alternatively or additionally, the processing device can furthermore be configured to activate the sensor system for monitoring the several monitoring regions if the processing device receives an instruction for adjusting the adjustable railing, preferably by a user interface. Alternatively or additionally, the processing device can be configured to deactivate the sensor system to terminate the monitoring of the several monitoring regions when a (e.g., successful) joint adjustment of the adjustable railings was concluded. Advantageously, normal mode or transport mode can accordingly take place uninfluenced by the monitoring, which can be used in particular only for automated adjustment. In normal mode, persons can accordingly go through the installation and, for example, correct errors within the monitoring regions (e.g., a jammed bottle), without this resulting in an additional warning or even safety shutdown of the installation. As a result of the deactivation, energy can advantageously also be saved.

Another aspect of the present disclosure relates to a method of operating an installation, preferably industrial installation or container processing installation or as disclosed herein. The method comprises receiving an instruction via a processing device (e.g., from a user interface) to adjust adjustable railings of several transport devices, which are arranged in a distributed manner in the installation. The method further comprises monitoring several monitoring regions that extend along the adjustable railing via a sensor system for person detection (e.g., by image recognition, movement detection, temperature detection, and/or acoustic detection), preferably in response to receiving the instruction (e.g., activated by the processing device). The method further comprises operating (e.g., controlling or instructing) the several transport devices for jointly adjusting the adjustable railings via the processing device depending on the monitoring of the several monitoring regions and in response to receiving the instruction. Advantageously, the method can achieve the same advantages that have already been described with reference to the installation. The same applies to the following exemplary embodiments.

In one exemplary embodiment, the several transport devices for jointly adjusting the adjustable railings are operated via the processing device in such a way that:

- the adjustable railings are only operated for joint adjustment if no person was detected in the several monitoring regions via the sensor system; and/or
- only those adjustable railings are operated for joint adjustment in whose (associated) monitoring regions no person was detected via the sensor system; and/or
- always only those adjustable railings are operated for joint adjustment in whose (associated) monitoring regions no person is detected via the sensor system, until finally all adjustable railings have been adjusted.

In another embodiment, the several transport devices for jointly adjusting the adjustable railings are operated via the processing device in such a way that:

- the joint adjustment of the adjustable railings is stopped when a person is detected in one of the several monitoring regions via the sensor system during the joint adjustment, and/or
- during the joint adjustment of the adjustable railings, an adjustment is stopped, preferably temporarily, only for that adjustable railing in whose (assigned) monitoring area a person is detected by the sensor system during the adjustment, and preferably continued when it has been detected via the sensor system that the person has left his (assigned) monitoring region again.

In another embodiment, the method further comprises at least one of the following:

- operating the several transport devices for transporting objects, preferably containers, via the processing device independently of the monitoring via the sensor system;
- activating the sensor system for monitoring the several monitoring regions via the processing device in response to receiving the instruction;
- deactivating the sensor system to conclude the monitoring of the several monitoring regions via the processing device in response to a (e.g., successful) ending of the joint adjustment of the adjustable railings;
- outputting a preferably acoustic and/or visual (e.g., first) warning signal to the several monitoring regions via at least one output device before and/or during the joint adjustment of the adjustable railings; and
- outputting a, preferably acoustic and/or visual, (e.g., second) warning signal via at least one output device when a person is detected in one of the several monitoring regions via the sensor system.

In one embodiment, the sensor system has at least one camera sensor device, at least one radar sensor device, at least one lidar sensor device, at least one thermal imaging camera sensor device, at least one laser sensor device, at least one LED sensor device, at least one distance sensor device, at least one motion sensor device, and/or at least one microphone. Advantageously, this can accordingly ensure reliable and systematic monitoring. Person recognition can be software-based, for example, on the basis of output signals from the sensor device(s). For example, in a thermal imaging camera, an evaluation of the temperature profiles of the thermal image recordings can be carried out to recognize a person.

In another embodiment, the sensor system has at least one sensor device for each monitoring region. Advantageously, this can enable particularly safe monitoring of the monitored areas.

In one embodiment variant, the several transport devices are at least partially multi-lane, and the adjustable railings have adjustable lane railings (inner railings) of the multi-lane transport device(s). Alternatively or additionally, the adjustable railings have adjustable outer rails.

In another embodiment variant, the sensor system and/or the processing device is configured (e.g., by software and/or hardware), and/or the several monitoring regions are arranged such that an adjustment of the adjustable railings does not result in person detection. Advantageously, this can accordingly reduce a risk of person misrecognition.

In another embodiment variant, the adjustable railings each have an adjustment region in which they are adjustable, and the several monitoring regions are arranged such that they correspond to or cover the adjustment regions. Advantageously, this can very reliably prevent people from injuring themselves on the adjustable railings.

As already mentioned, the installation is particularly preferably a container processing installation. Preferably, the container processing installation can be designed for manufacturing, cleaning, coating, checking, filling, closing, labeling, printing, and/or packaging containers for liquid media, preferably beverages or liquid foods.

Preferably, the several transport devices can connect one or more container processing devices for transporting containers together.

For example, the containers can be configured as bottles, cans, canisters, cartons, vials, etc.

Preferably, the term "processing device" can refer to an electronic plant (e.g., embodied as a driver circuit or with microprocessor(s) and data memory) and/or a mechanical, pneumatic, and/or hydraulic controller which can take over control tasks and/or regulation tasks and/or processing tasks, depending on the design. Although the term "control" is used herein, this can also comprise or be understood as "regulate" or "feedback-control" and/or "process."

The preferred embodiments and features of the invention described above can be combined with one another as desired.

BRIEF DESCRIPTION OF THE FIGURE

Further details and advantages of the invention are described below with reference to the accompanying drawing. In the FIGURE:

FIG. 1 shows a schematic plan view of an installation for labeling according to an exemplary embodiment of the present disclosure.

DETAILED DESCRIPTION OF EMBODIMENTS

FIG. 1 shows an installation 10, also referred to as an installation apparatus or installation configuration. The installation 10 has several transport devices 14, a sensor system 20 and a processing device 26. The installation 10 can furthermore have several processing devices 12 and/or at least one output device 24.

The installation 10 can preferably be an industrial installation for producing and/or processing objects. Particularly preferably, the installation 10 can be a container processing installation for processing containers.

The processing devices 12 can be designed depending on the particular type of installation 10. The processing devices 12 can preferably be designed as container processing devices.

For example, the processing devices 12 can have a container-producing device (e.g., container blowing machine), a coating device, a depalletizer, a rinsing device (e.g., with rinsing nozzles), a sterilizing device (e.g., with sterilization nozzles), a filling device (e.g., with filling valves), a closing device (e.g., with closing heads), a labeling device (e.g., with labeling assemblies), a printing device (e.g., with print heads), a pasteurization device, an adhesive container producing device (e.g., with adhesive application nozzles), a packaging device (e.g., with packing heads or film wrappers), and/or a palletizing device (e.g., with palletizing heads, sliding plates, or the like).

The transport devices 14 can convey objects through the installation 10. The transport devices 14 preferably support the objects on the floor side during transport. For example, the transport devices 14 can be designed at least partially as a belt conveyor, e.g., hinged slat chain conveyors or mat chain conveyors, or plate conveyors.

The transport devices 14 are preferably designed as linear conveyors. It is possible for the installation 10 to have additionally and/or differently designed transport devices such as transport stars (not shown in FIG. 1).

The transport devices 14 are arranged distributed in the installation 10. The transport devices 14 can be arranged separately and at a distance from one another. For example, two adjacent transport devices 14 can be spaced apart from one another by an interposed/intermediately arranged processing device 12.

The transport devices 14 can each be arranged between two processing devices 12. The transport devices 14 can each connect at least two processing devices 12 to one another. The transport devices 14 can transport objects between two processing devices 12 in each case.

The transport devices 14 can preferably be designed as container conveyors for conveying containers through the installation 10. The container conveyors can each connect at least two container processing devices to one another.

The transport devices 14 each have at least one adjustable railing 16 for setting the transport width. The railings 16 may have outer railings of the transport devices 14, as shown schematically in FIG. 1. Alternatively or additionally, it is also possible for the transport devices 14 to be multi-lane and the railing 16 to be designed as internal railings/lane railings. It is also possible for the transport devices 14 to be single-lane or single-track.

The transport devices 14 preferably each have at least two adjustable railings 16 which are opposite one another and/or run parallel to one another.

The railings 16 can, for example, be rod-shaped, rail-shaped or plate-shaped. The railings 16 can extend along a transport path specified by the particular transport device 14 for the objects to be transported. The railings 16 can be at least partially straight and/or at least partially curved. The railings 16 can guide the objects laterally during transport.

The railings 16 can be adjustable transversely to a transport direction of the particular transport device 14. For example, the railings 16 can be adjustable transversely to a longitudinal axis of the particular transport device 14. The railings 16 are preferably horizontally adjustable. It is also possible for the railings 16 to be vertically adjustable.

During the adjustment of the railings 16 of a transport device 14, these can be moved toward one another, for example. For example, a total transport width or a transport lane width of the particular transport device 14 can thereby be reduced. During the adjustment of the railings 16, they can, on the other hand, be moved away from one another. For example, a total transport width or a transport lane width of the particular transport device 14 can thereby be increased.

An adjustment of the railing 16 can be effected by a drive device 18 of the particular transport device 14. The drive device 18 can be connected to drive the at least one railing 16 of the particular transport device 14. For example, the drive device 18 and the at least one railing 16 of the particular transport device 14 can be connected to one another via a gearbox. For example, the drive device 18 can be designed as an electric drive.

The sensor system 20 is designed to monitor several monitoring regions 22 for detecting people. Each monitoring region 22 can extend along at least one of the several railings 16. Preferably, the monitoring regions 22 can extend next to the railings 16 and/or the transport devices 14, e.g., to both longitudinal sides of the railings 16. Preferably, the monitoring regions 22 can be dimensioned such that they cover the adjustment regions of the railings 16. For example, each monitoring region 22 can surround one of the transport devices 14 or at least one railing 16.

The sensor system 20 can preferably have its own sensor device for each monitoring region 22, as shown in FIG. 1. However, it is also possible for a sensor device of the sensor system 20 to monitor, for example, several (e.g., adjacent) or all monitoring regions 22.

Person recognition can be performed, for example, by image recognition, motion detection, temperature detection, and/or acoustic detection. In person detection, it can be detected whether or not a person is present in one of the monitoring regions 22. It can preferably be detected in which monitoring regions a person is present and in which, not.

Person recognition can preferably be performed by the sensor system 20 and/or by the processing device 26. Preferably, the sensor system 20 and/or the processing device 26 is configured and/or the monitoring regions 22 are arranged such that an adjustment of the railing 16 does not lead to a false detection of a presence of a person.

The sensor system 20 can be designed in any way for monitoring the monitoring regions 22. For example, the sensor system 20 can have at least one camera sensor device, at least one radar sensor device, at least one lidar sensor device, at least one thermal imaging camera sensor device, at least one laser sensor device, at least one LED sensor device, at least one distance sensor device, at least one motion sensor device, and/or at least one microphone.

The at least one output device 24 can output warning signals to the monitoring regions 22. The warning signals can be acoustic and/or visual, for example. For example, the at least one output device 24 can have a display, a signal light, and/or a loudspeaker. An output device 24, the output of which is directed into the particular monitoring region 22, is preferably associated with each monitoring region 22. For example, the several output devices 24 can each be arranged in an edge and/or corner section of a particular monitoring region 22.

The processing device 26 is configured to operate the several transport devices 14 for jointly adjusting the railings 16. The joint adjustment is dependent on the monitoring for person detection in the monitoring regions 22 via the sensor system 20. During the joint adjustment, the railings 16 of the several transport devices 14 can be adjusted simultaneously or at least in a temporally overlapping manner. For the joint adjustment, the processing device 26 can, for example, correspondingly control the particular drive devices 18 or communicate with them.

The processing device 26 can, for example, take the form of a central control device, as shown in FIG. 1. Alternatively, the processing device 26 can be formed, for example, by several decentralized control units which communicate with one another, e.g., one control unit per transport device 14.

The processing device 26 can be communicatively linked with the transport devices 14, the control system 20, the drive devices 18, and/or the railings 16. The communication link can be wireless or wired. Preferably, the processing device 26 can receive signals from the control system 20 and transmit signals to the drive devices 18.

In the following, it is explained by way of example how the installation 10 can be operated for jointly adjusting the railings 16.

First, the processing device 26 can receive an instruction for adjusting the railings 16 of the transport devices 14. The instruction can, for example, be received as a control command. The instruction can, for example, be received from a user interface of the installation 10. A user can have the user interface operated to output the instruction. Alternatively, the instruction can be received, for example, from an automatically running program for operating the installation 10.

Provided that the person detection in the monitored areas 22 indicates that no person is in the monitored areas 22, the processing device 26 can operate the railings 16 for joint adjustment in accordance with the received instruction.

The monitoring of the monitoring regions 22 via the sensor system 20 can be constantly active during operation of the installation 10. Preferably, the monitoring of the monitoring regions 22 via the sensor system 20 is then conditionally queried and/or evaluated by the processing device 26 when the railings 16 are to be adjusted, i.e., for example, if the processing device 26 receives the instruction for adjusting.

Alternatively, the monitoring of the monitoring regions 22 can be activated by the processing device 26 via the sensor system 20 if the processing device 26 the instruction for adjusting the railings 16. For example, the sensor system 20 can be activated from a standby mode or from a switched-off state. After the railing 16 has been adjusted, the sensor system 20 can preferably be deactivated, for example into a standby mode or a switched-off state.

If, on the other hand, the monitoring of the monitoring regions 22 results in a person being recognized in one of the monitoring regions 22, several (operating) options or possibilities for the processing device 26 exist in principle. For example, the processing device 26 can be configured such that none of the railings 16 is adjusted when a person has been detected in any of the monitoring regions 22. Alternatively or in another operating mode, the processing device 26 can be configured to operate only those railings of the several railings 16 for joint adjustment, in the monitoring regions 22 of which no person was detected. In a development, the processing device 26 can be configured to operate only those railings of the several railings 16 for joint adjustment, in the monitoring regions 22 of which no person is currently detected until all adjustable railings 16 have finally been adjusted.

The monitoring regions 22 can also be monitored further by the sensor system 20 during the adjustment of the railings 16. If a person is detected in one of the monitoring regions 22 during the adjustment, the processing device 26 can, for example, stop all adjustments of the railings 16. Alternatively or in another operating mode, the processing device 26 can only stop an adjustment, preferably temporarily, for that adjustable railing 16 in the monitoring region of which a person is detected via the sensor system 20 during the adjustment. In a development, the adjustment of this stopped railing 16 can then be continued if it has been recognized via the sensor system 20 that the person has left the relevant monitoring region 22.

Before and/or during the adjustment of the railings 16, the processing device 26 can operate the at least one output device 24 to output a warning signal. Alternatively or additionally, the processing device 26 can operate the at least one output device 24 to output a warning signal if a person is detected in one of the monitoring regions 22.

Any monitoring of the monitoring regions 22 preferably has no effect on a transport mode of the installation 10, in which the transport devices 14 transport objects such as containers, or is not activated at all. In other words, the processing device 26, e.g., before or after the joint adjustment of the railings 16, can operate the several transport devices 14 to transport objects independently of the monitoring of the monitoring regions 22 via the sensor system 20.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or the configuration of the transport devices, the sensor system, and/or the processing device of independent claim 1.

LIST OF REFERENCE SIGNS

10 Installation
12 Processing device
14 Transport device
16 Railings
18 Drive device
20 Sensor system
22 Monitored region
24 Output device
26 Processing device

The invention claimed is:

1. An installation, comprising:
a plurality of transport devices for transporting objects through the installation, wherein the plurality of transport devices are arranged distributed in the installation and each have at least one adjustable railing for setting a transport width;
a sensor system that is configured to monitor a plurality of monitoring regions that each extend along one of the several adjustable railings for person detection;
a processing device that is configured to operate the several transport devices for jointly adjusting the adjustable railings depending on the monitoring of the plurality of monitoring regions via the sensor system;
wherein the processing device is also configured to stop an adjustment during the joint adjustment of the adjustable railings; and
wherein the processing device is further configured to stop the adjustment during the joint adjustment of the adjustable railings only for one of the adjustable railings in the monitoring region of which a person is detected by the sensor system during the joint adjustment, and to continue when it has been detected via the sensor system that the person has left the monitoring region of which the person is detected by the sensor system during the joint adjustment.

2. The installation according to claim 1, wherein the objects are containers.

3. The installation according to claim 1, wherein:
the processing device is further configured to operate the adjustable railings for joint adjustment only when no person has been detected in the plurality of monitoring regions by the sensor system.

4. The installation according to claim 1, wherein at least one of:
the processing device is further configured to operate only those adjustable railings for joint adjustment, in the monitoring regions of which no person was detected by the sensor system; and
the processing device is further configured to always operate only those adjustable railings for joint adjustment, in the monitoring regions of which no person is detected by the sensor system until finally all adjustable railings have been adjusted.

5. The installation according to claim 1, further having:
at least one output device for outputting warning signals to the plurality of monitoring regions,
wherein the processing device is further configured to at least one of:
operate the at least one output device to output a warning signal before and/or during the joint adjustment of the adjustable railings; and
operate the at least one output device for outputting a warning signal when a person is detected in one of the plurality of monitoring regions.

6. The installation according to claim 1, wherein:
the processing device is further configured to stop the joint adjustment of the adjustable railings when a person is detected in one of the plurality of monitoring regions via the sensor system during the joint adjustment.

7. The installation according to claim 1, wherein:
the processing device is further configured to operate the plurality of transport devices for transporting the objects independently of the monitoring of the plurality of monitoring regions via the sensor system.

8. An installation, comprising:
a plurality of transport devices for transporting objects through the installation, wherein the plurality of transport devices are arranged distributed in the installation and each have at least one adjustable railing for setting the transport width;
a sensor system that is configured to monitor a plurality of monitoring regions that each extend along one of the several adjustable railings for person detection;
a processing device that is configured to operate the plurality of transport devices for jointly adjusting the adjustable railings depending on the monitoring of the plurality of monitoring regions via the sensor system;
wherein at least one of:
the processing device is further configured to activate the sensor system for monitoring the plurality of monitoring regions when the processing device receives an instruction for adjusting the adjustable railings; and
the processing device is configured to deactivate the sensor system to terminate the monitoring of the plurality of monitoring regions when a joint adjustment of the adjustable railings was concluded.

9. The installation according to claim 8, wherein the processing device is further configured to activate the sensor system for monitoring the plurality of monitoring regions when the processing device receives the instruction for adjusting the adjustable railings from a user interface.

10. The installation according to claim 1, wherein at least one of:
the sensor system has at least one of: at least one camera sensor device, at least one radar sensor device, at least one lidar sensor device, at least one thermal imaging camera sensor device, at least one laser sensor device, at least one LED sensor device, at least one distance sensor device, at least one motion sensor device, and at least one microphone; and the sensor system has at least one sensor device for each monitoring region.

11. The installation according to claim 1, wherein at least one of:

the plurality of transport devices are at least partially multi-lane, and the adjustable railings have adjustable lane railings of multi-lane transport device/devices; and the adjustable railings have adjustable outer rails.

12. The installation according to claim 1, wherein at least one of:

at least one of the sensor systems and the processing device is configured such that an adjustment of the adjustable railings does not result in a person detection; and the plurality of monitoring regions are arranged such that the adjustment of the adjustable railings does not result in the person detection; and the adjustable railings each have an adjustment region in which the adjustable railings are adjustable, and the monitoring regions are arranged such that they one of correspond to and cover the adjustment regions.

13. A method for operating an installation having a plurality of transport devices for transporting objects through the installation, wherein the plurality of transport devices are arranged distributed in the installation and each have at least one adjustable railing for setting the transport width, wherein the installation also includes a sensor system that is configured to monitor a plurality of monitoring regions that each extend along one of the several adjustable railings for person detection; and wherein the installation further includes a processing device that is configured to operate the plurality of transport devices for jointly adjusting the adjustable railings depending on the monitoring of the plurality of monitoring regions via the sensor system, the method comprising:

receiving, via the processing device, an instruction for adjusting adjustable railings of the plurality of transport devices which are arranged in a distributed manner in the installation;

monitoring the plurality of monitoring regions that extend along the adjustable railings via the sensor system for person recognition; and operating the the plurality of transport devices for jointly adjusting the adjustable railings via the processing device depending on the monitoring of the several monitoring regions and in response to receiving the instruction.

14. The method of claim 13, wherein the step of monitoring the plurality of monitoring regions that extend along the adjustable railings via the sensor system for person recognition is in response to receiving the instruction.

15. The method according to claim 13, wherein the plurality of transport devices for jointly adjusting the adjustable railings are operated via the processing device in such a way that at least one of:

the adjustable railings are only operated for joint adjustment if no person was detected in the plurality of monitoring regions via the sensor system;

only those adjustable railings are operated for joint adjustment in whose monitoring regions no person was detected via the sensor system; and always only those adjustable railings are operated for joint adjustment in whose monitoring regions no person is detected via the sensor system, until all adjustable railings have been adjusted.

16. The method according to claim 13, wherein the plurality of transport devices for jointly adjusting the adjustable railings are operated via the processing device in such a way that at least one of:

the joint adjustment of the adjustable railings is stopped when a person is detected in one of the plurality of monitoring regions via the sensor system during the joint adjustment; and/or during the joint adjustment of the adjustable railings, an adjustment stops for that adjustable railing in the monitoring region of which a person is detected by the sensor system during the adjustment.

17. The method of claim 16, wherein during the joint adjustment of the adjustable railings, the adjustment stops temporarily for that adjustable railing in the monitoring region of which a person is detected by the sensor system during the adjustment, and continues when it has been detected via the sensor system that the person has left the monitoring region of which the person is detected by the sensor system during the joint adjustment.

18. The method according to claim 13, further comprising at least one of the following:

operating the plurality of transport devices for transporting objects via the processing device independently of the monitoring via the sensor system;

activating the sensor system for monitoring the plurality of monitoring regions via the processing device in response to receiving the instruction;

deactivating the sensor system to conclude the monitoring of the plurality of monitoring regions via the processing device in response to ending the joint adjustment of the adjustable railings;

outputting a warning signal to the plurality of monitoring regions via at least one output device at least one of before and during the joint adjustment of the adjustable railings; and outputting a warning signal via at least one output device when a person is detected in one of the plurality of monitoring regions via the sensor system.

* * * * *